(12) United States Patent
Cheng et al.

(10) Patent No.: US 10,042,180 B1
(45) Date of Patent: Aug. 7, 2018

(54) TWO-PART GLASSES RETAINER

(71) Applicants: Yung-Ching Cheng, Tainan (TW);
Yung-Ming Cheng, Tainan (TW)

(72) Inventors: Yung-Ching Cheng, Tainan (TW);
Yung-Ming Cheng, Tainan (TW)

( * ) Notice: Subject to any disclaimer, the term of this patent is extended or adjusted under 35 U.S.C. 154(b) by 0 days.

(21) Appl. No.: 15/475,771

(22) Filed: Mar. 31, 2017

(51) Int. Cl.
*G02C 3/00* (2006.01)
*G02C 5/20* (2006.01)
*F16C 11/06* (2006.01)

(52) U.S. Cl.
CPC .......... *G02C 3/006* (2013.01); *F16C 11/0614* (2013.01); *G02C 5/20* (2013.01); *F16C 2370/20* (2013.01)

(58) Field of Classification Search
CPC ...... G02C 3/006; G02C 2200/18; G02C 5/20; G02C 5/04; F16C 11/0614; F16C 11/0619; F16C 11/0623; F16C 2370/20
USPC ....... 351/119, 121, 140, 142, 148, 150, 157, 351/158
See application file for complete search history.

(56) References Cited

U.S. PATENT DOCUMENTS

| | | | |
|---|---|---|---|
| 8,931,895 B2 * | 1/2015 | Cheng | G02C 3/003 351/156 |
| 9,140,906 B1 * | 9/2015 | Wanderer | G02C 5/143 |
| 2009/0303431 A1 * | 12/2009 | Ifergan | G02C 5/10 351/153 |
| 2012/0307199 A1 * | 12/2012 | Krisik | G02C 3/003 351/157 |

FOREIGN PATENT DOCUMENTS

| TW | M385707 U | 8/2010 |
|---|---|---|
| TW | M467888 U | 12/2013 |

* cited by examiner

*Primary Examiner* — Jordan Schwartz
(74) *Attorney, Agent, or Firm* — Rosenberg, Klein & Lee (57) ABSTRACT

A two-part glasses retainer is disclosed. It comprises a temple cap for embedding a temple of a pair of glasses, a first strap connected to the temple cap at one end thereof, a valve seat connected to the other end of the first strap and having a chamber, a ball valve accommodated in the valve seat and a second strap connected to the ball valve.

6 Claims, 8 Drawing Sheets

TWO-PART GLASSES RETAINER

BACKGROUND OF THE INVENTION

1. Field of the Invention

This invention relates to a two-part glasses retainer comprising adjustable front and back straps.

2. Description of Related Art

People who wear glasses often encounter a situation of falling of their glasses accidentally when working, walking or exercising. To effectively prevent the glasses being damaged because of dropping on the ground, one can use a glass retainer connected to temples of glasses for hanging the glasses on his/her neck. Accordingly, when he/she takes off the glasses during a short break, the glasses retainer can also prevent the glasses dropping or crushing on the ground due to inappropriately placing the glasses.

The Taiwan Pat. No. M385707U1, issued on 1 Aug. 2010, disclosed an improved glasses retainer which is primarily composed of a glasses having a hanging hole on each of temples thereof and a strap having positioning elements at its two ends. The positioning element comprises a stacking unit at one terminal and a clamping portion having elasticity at the other terminal. Accordingly, by bonding the clamping portion of the positioning element to the hanging hole of the glasses temple, users can easily hold the glasses in the neck. Although the abovementioned improved glasses retainer is convenient for a person to wear glasses, it still has few disadvantages to be improved:

1. The strap of the glasses retainer is pliable and its angle cannot be adjusted according to the users' demand.
2. The stacking unit made of metal ring may damage and lead to an abrasion of the temples of the glasses, and the temples must be drilled with a hanging hole for linking to the stacking unit of the strap.
3. The abovementioned structure is not convenient to assemble or disassemble.

For further improving the glasses retainer described above, adjustable glasses retainers are developed. For instance, the Taiwan Pat. No. M467888 U, issued on 11 Dec. 2013, disclosed an adjustable glasses retainer comprising a stiffen strap made of a rigid material, two positioning clips respectively mounted around two ends of the stiffen strap, two ball plugs, and two temple caps made of an elastic-soft material. Each of the ball plugs comprises a groove for accommodating the positioning clip, a through hole disposed on the groove for passing the stiffen strap therethrough and a plurality of protruding blocks disposed in the rim of an opening of the groove to engage and position the positioning clip. The temple cap is further provided with a chamber on an opening thereof to embed the temple, and a spherical chamber on the other end thereof to engage the ball plug. The spherical chamber comprises an adjustment hole for providing the stiffen strap passed therethrough to adjust an angle. However, the abovementioned adjustable glasses retainer cannot match the curve of a user's neck appropriately.

SUMMARY OF THE INVENTION

This invention relates to a two-part glasses retainer comprising front and back straps that can be adjusted effectively. The major purpose and the effects of the two-part glasses retainer are achieved by the following technical features:

The two-part glasses retainer comprises a temple cap, a first strap, a valve seat, a ball valve and a second strap. A temple of glasess is embedded to the temple cap, and the temple cap is further connected to one end of the first strap. The valve seat is connected to the other end of the first strap. The valve seat comprises a chamber to accommodate the ball valve, and the ball valve is connected to the second strap. Accordingly, the straps of the two-part glasses retainer can be angularly adjusted by rotation of the ball valve within the valve seat.

In one embodiment of this invention, the valve seat comprises a chamber to accommodate the ball valve. The chamber comprises a regulation path at a first open end thereof and a through groove at a second end thereof. The first strap is further provided with a first positioning element at a terminal end to further engage with and position in the through groove, so that the first strap enables to be positioned in the through groove.

In one embodiment of this invention, the ball valve comprises an embedding hole into which a second positioning element provided at a terminal end of the second strap is inserted for positioning purposes.

In one embodiment of this invention, the embedding hole is further provided with at least one block at an open end of an inner edge of the through hole, to connect and limit the second positioning element.

In one embodiment of this invention, the ball valve further comprises a tangent plane, and the tangent plane is correspondingly engaged with the regulation path for positioning the ball valve.

Accordingly, the two-part glasses retainer of this invention described above has the following advantages compare to prior arts:

1. The design of the two straps of this invention is ergonomic and provides space flexibility for adjusting the straps.
2. The design of the ball valve rotated in the valve seat of this invention provides more flexibility to adjust the angle of the straps.
3. The design of the tangent plane of this invention provides a positioning function of the ball valve by correspondingly engaging the tangent plane with the regulation path.

DETAILED DESCRIPTION OF THE PREFERRED EMBODIMENT

In the following detailed description, for purposes of explanation, numerous specific details are set forth in order to provide a thorough understanding of the disclosed embodiments.

Referring to FIG. 1 to FIG. 4, an exploded diagram and three stereograms of the present invention are disclosed. An unilateral structure of a two-part glasses retainer of the prevent invention is disclosed, comprising:

a temple cap (1), for embedding a temple (A) of a pair of glasses;

a first strap (2) connected to the temple cap (1) at one end thereof;

a valve seat (3) connected to the other end of the first strap (2) and comprises two wing portions (31) having a through hole (311) bored therein, a chamber (32) communicated with the through hole (311), and a regulation path (33) for communicating with a first open end of the chamber (32), wherein the chamber (32) and the regulation path (33) are formed between the two wing portions (31);

a ball valve (4), embedded to the through hole (311) correspondingly and accommodated inside the chamber (32); and a second strap (5), connected to the ball valve (4) and passes through the regulation path (33), and moves inside the regulation path (33) through rotation of the ball valve (4) within the chamber (32).

Figure 1:
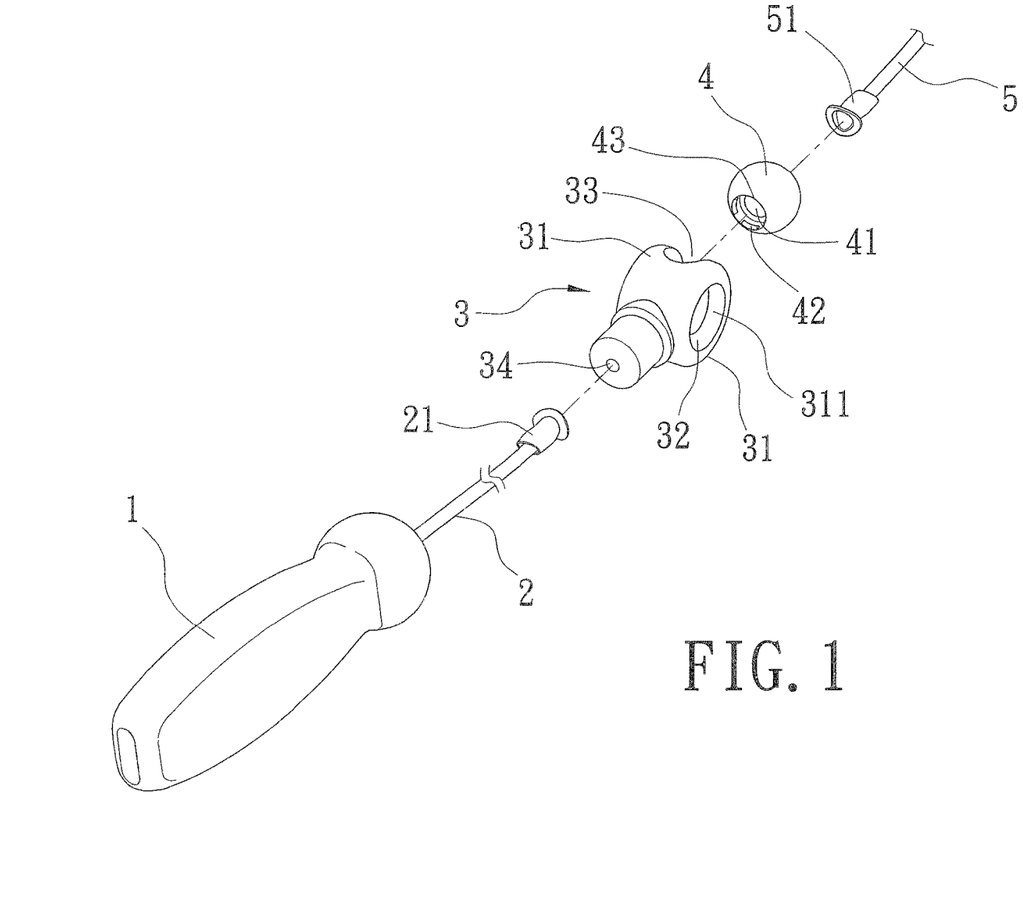
FIG. 1 is an exploded diagram showing a two-part glasses retainer according to the present invention.
Figure 2:
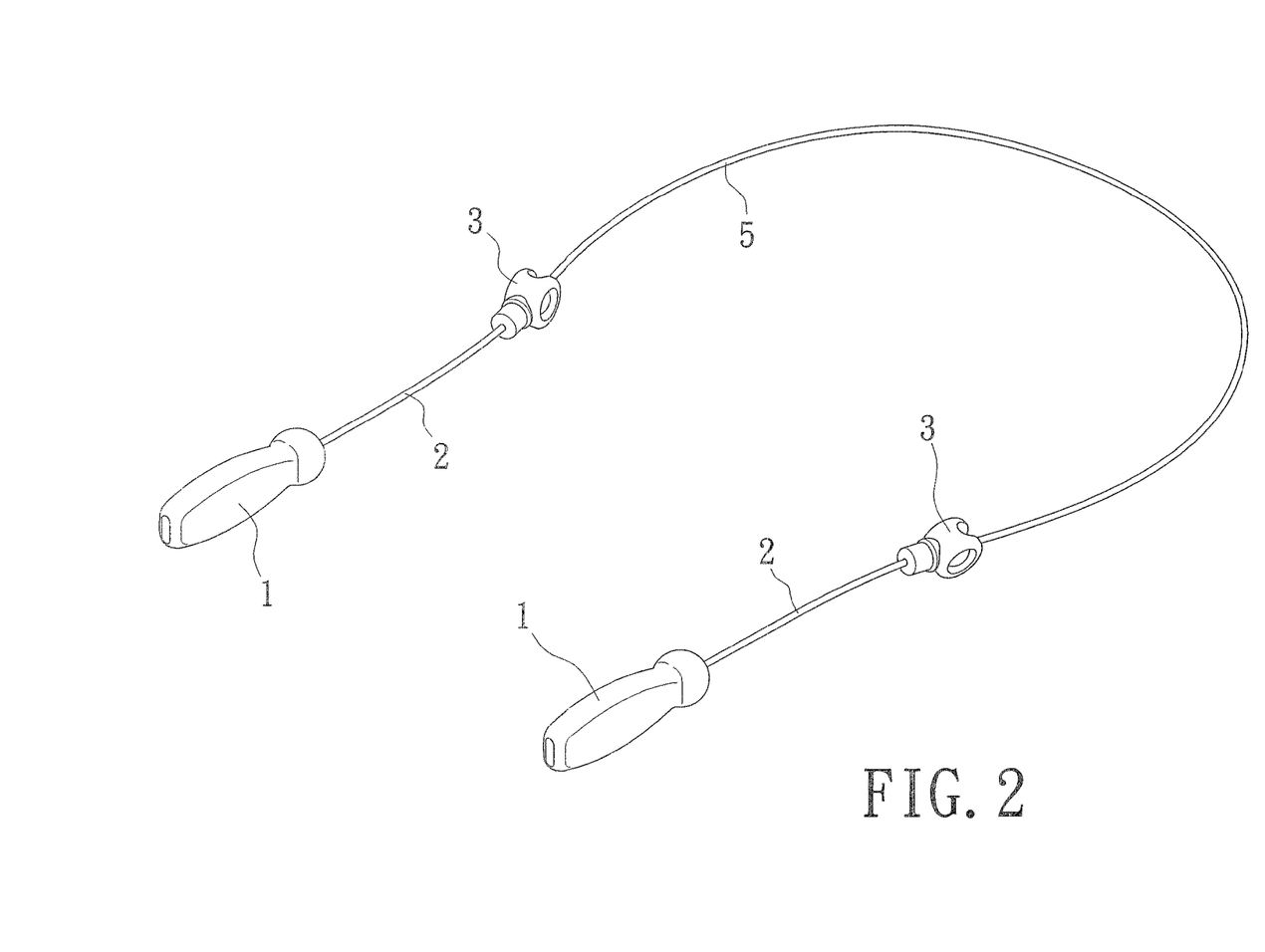
FIG. 2 is a stereogram showing the two-part glasses retainer in assembly according to the present invention.
Figure 3:
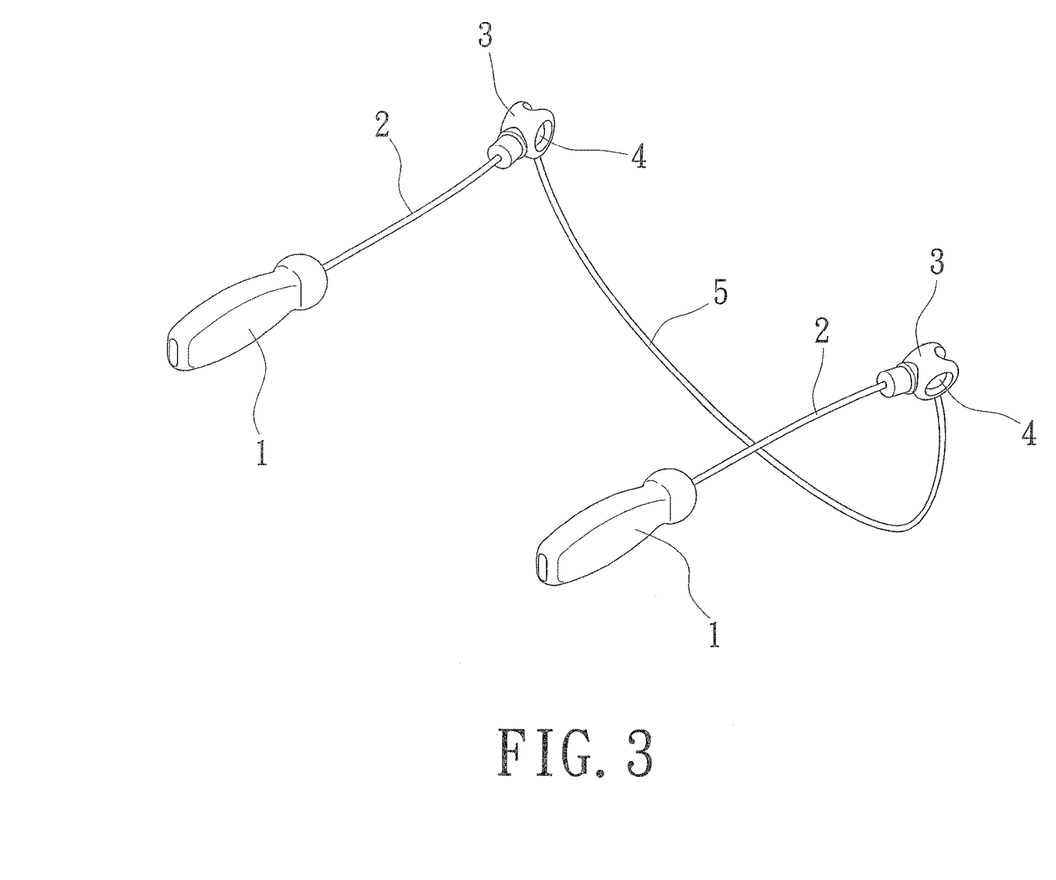
FIG. 3 is a stereogram showing the second strap in a state of downward displacement.
Figure 4:
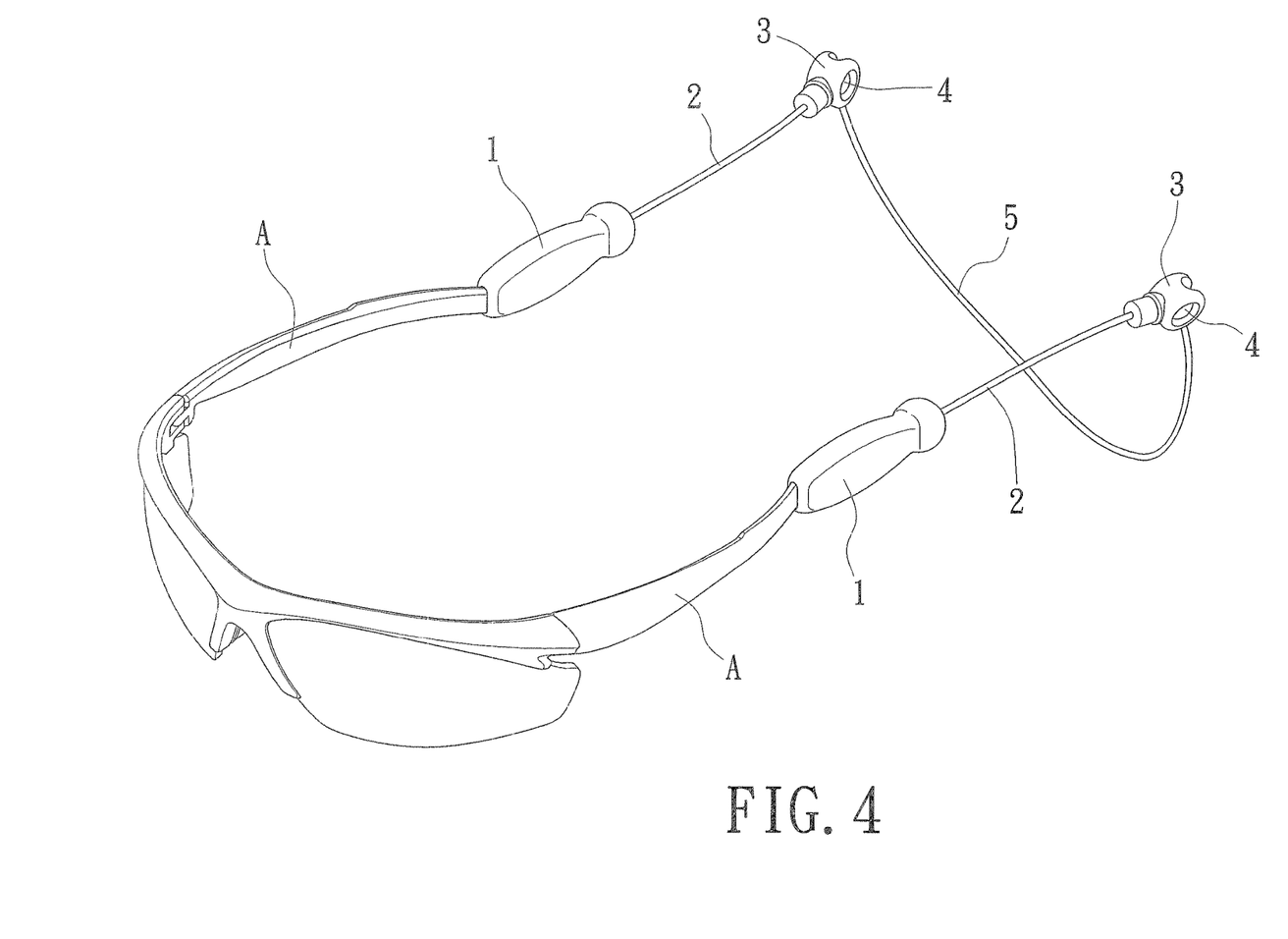
FIG. 4 is a stereogram showing the two-part glasses retainer disposed on a pair of glasses according to the present invention.

FIG. 2 is a stereogram showing the two-part glasses retainer in assembly according to the present invention. As shown in FIG. 3 and FIG. 4, the second strap (5) can be adjusted angularly through rotation of the ball valve (4) inside the valve seat (3).

As shown in FIG. 1 to FIG. 7, the connection between the first strap (2) and the valve seat (3), and the connection between the ball valve (4) and the second strap (5) are presented in multiple types including direct forming, riveting, ejection molding, etc. For instance, an embodiment according to the present invention is disclosed as the following.

The chamber (32) of the valve seat (3) is provided with a through groove (34) at a second end for accommodating the first strap (2), and the first strap (2) is provided with a first positioning element (21) at the other end to engage with and position in the through groove (34). The second strap (5) is passed through the regulation path (33) of the valve seat (3) and the through hole (311) of the wing portion (31) sequentially to engage with the ball valve (4). Moreover, the second strap (5) is further provided with a second positioning element (51) to engage with and position in an embedding hole (41) of the ball valve (4), allowing the ball valve (4) to be accommodated and positioned inside the chamber (32) by embedding in the through hole (311) of the wing portion (31). The embedding hole (41) is further provided with at least one block (42) at an open end of an inner edge to connect and limit the second positioning element (51).

Figure 5:
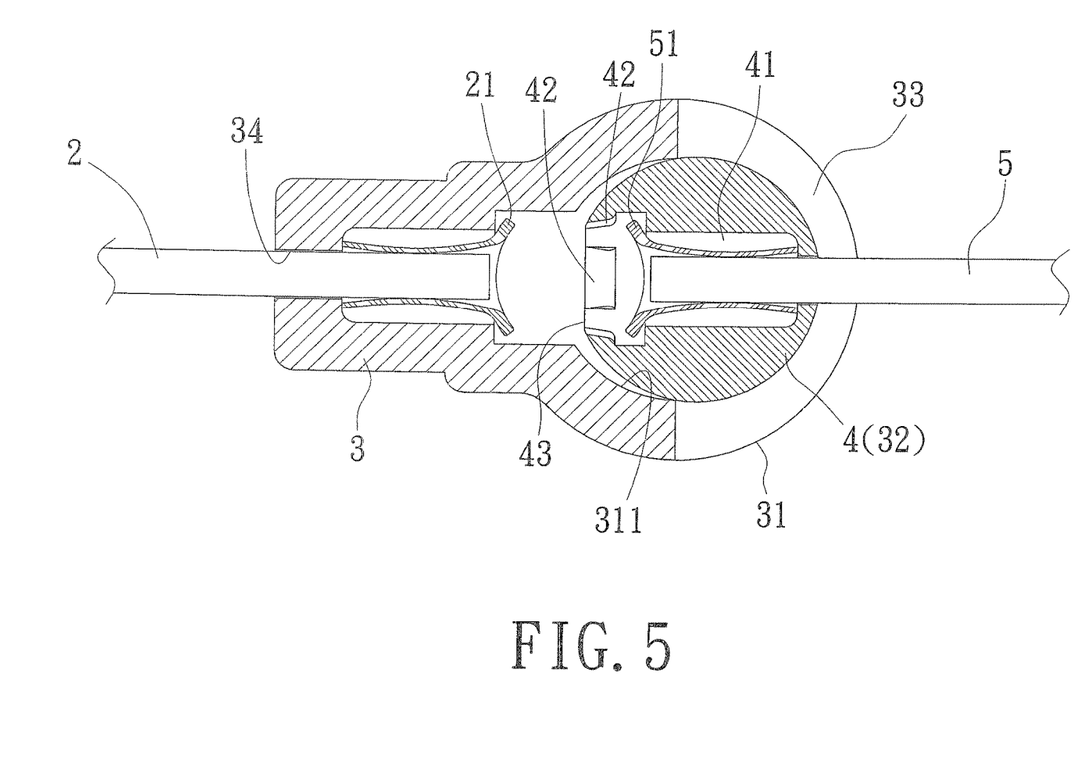
FIG. 5 is a sectional view showing the two-part glasses retainer in assembly according to the present invention.
Figure 6:
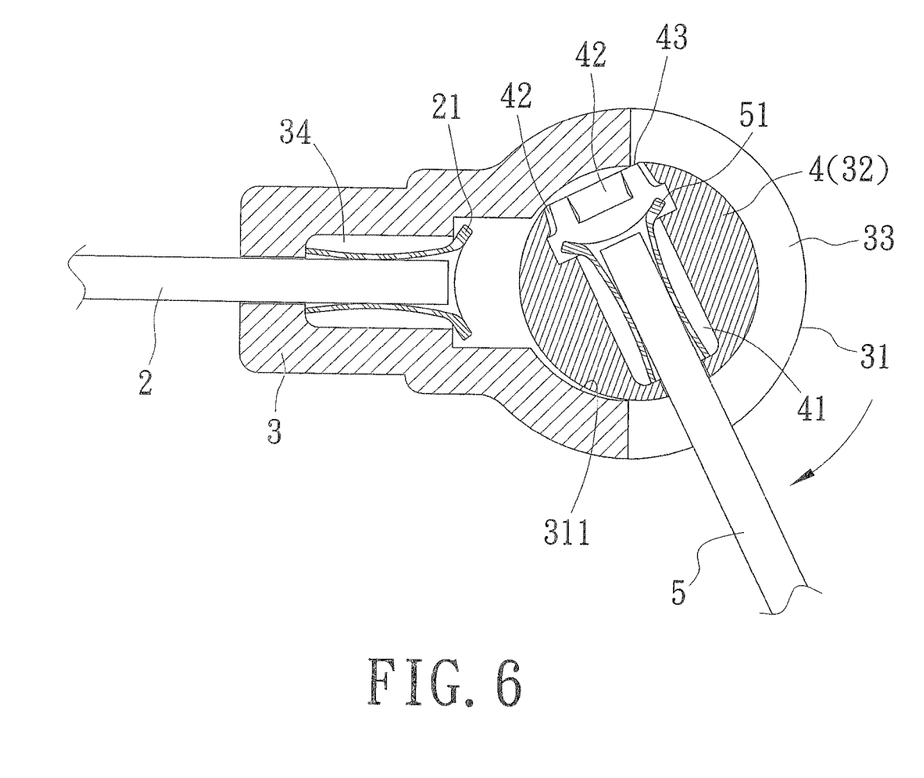
FIG. 6 is a sectional view showing the ball valve rotating relatively to the valve seat for adjusting a rotation angle of the second strap.
Figure 7:
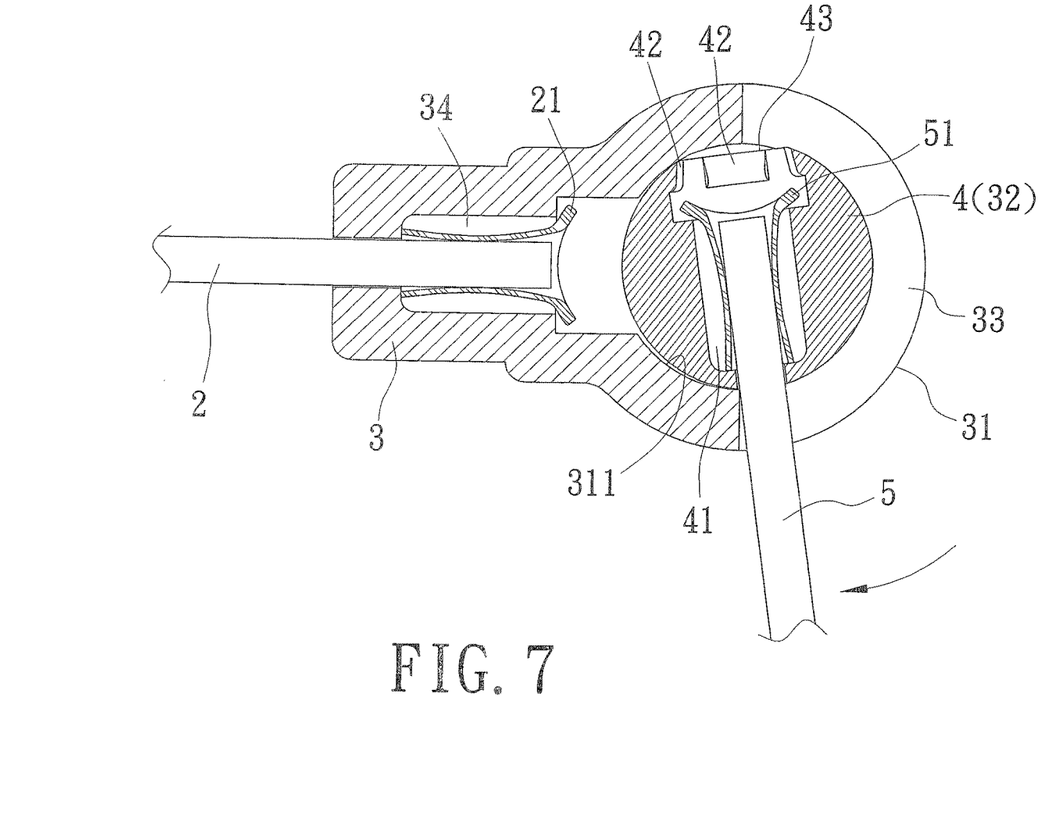
FIG. 7 is a sectional view showing the second strap in a state of downward displacement.

In use of the two-part glasses retainer of this invention, two temples (A) of a pair of glasses are embedded into the temple caps (1), and the straps are placed around a user's neck. Accordingly, the user can adjust angles of the straps according to his/her demands by pulling and moving the second strap (5) within the regulation path (33) so that the ball valve (4) is driven to rotate inside the chamber (32) correspondingly. Referring to FIG. 5 to FIG. 6, the ball valve (4) is further provided with a tangent plane (43), and the tangent plane (43) is correspondingly engaged with the regulation path (33) for positioning the ball valve (4) when the user alters the angles of the straps. A sectional view showing the second strap (5) in a state of downward displacement is also disclosed in FIG. 7.

Figure 8:
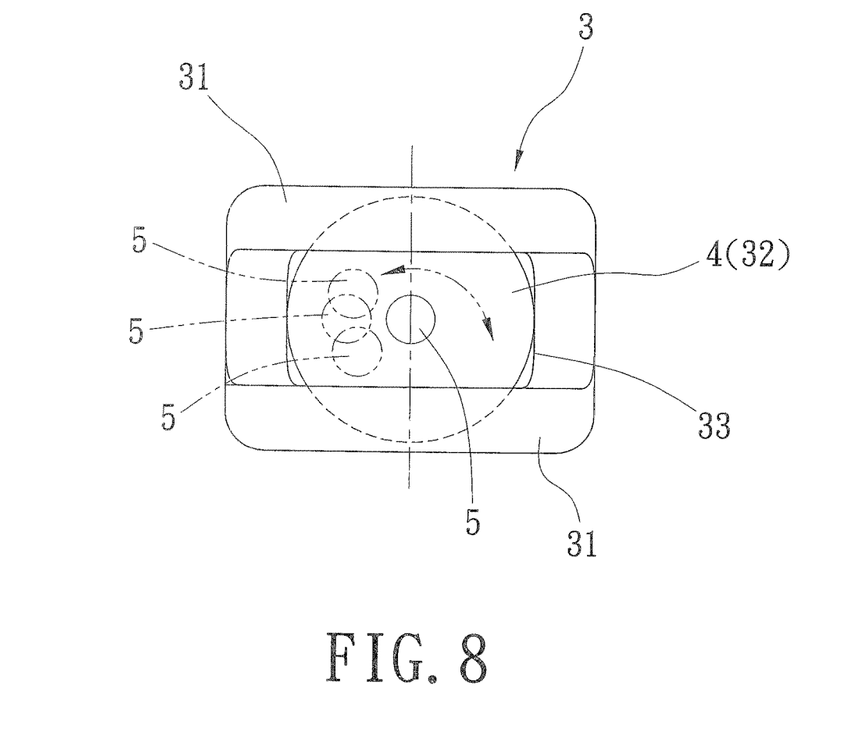
FIG. 8 is a back views showing the second strap actuating the ball valve to arbitrarily rotate in the regulation path.

As shown in FIG. 8, the second strap (5) can be driven to rotate the ball valve (4) freely within the space of the regulation path (33) because the width of the regulation path (33) is wider than the diameter of the second strap (5) and is narrower than the diameter of the ball valve (4). Thus, the adjustable range and angle of the straps are increased, and the straps are protected.

From the illustrations of the embodiments above, it can be known that this invention, compared with the conventional technologies available now, has the following advantages:

1. The design of the two straps of this invention is ergonomic and provides space flexibility for adjusting the straps.

2. The design of the ball valve rotated in the valve seat of this invention provides more flexibility to adjust the angle of the straps.

3. The design of the tangent plane of this invention provides a positioning function of the ball valve by correspondingly engaging the tangent plane with the regulation path.

What is claimed is:

1. A retainer for eyeglasses comprising:
a temple cap for embedding a temple of a pair of glasses;
a first strap connected to the temple cap at one end thereof;
a valve seat connected to the other end of the first strap and comprising two wing portions having a through hole bored therein in a direction perpendicular to the temple, a chamber with a chamber wall, the chamber communicated with the through hole, and a regulation path for communicated with a first open end of the chamber, wherein the chamber and the regulation path are formed between the two wing portions;
a ball valve pivotally accommodated inside the chamber and inside the through hole for rotation within the valve seat and comprising a planar portion defined by an opening at one end thereof, wherein the planar portion is correspondingly engaged with the chamber wall for positioning the ball valve; and
a second strap connected to the ball valve and passing through the regulation path for moving therein.

2. The retainer for eyeglasses of claim 1, wherein the chamber is provided with a through groove at a second end thereof, and the first strap is provided with a first positioning element at a terminal end thereof to engage with and position in the through groove.

3. The retainer for eyeglasses of claim 1, wherein the ball valve further has an embedding hole therein for accommodating the second strap, and the second strap is provided with a second positioning element to engage with and position in the embedding hole.

4. The retainer for eyeglasses of claim 2, wherein the ball valve further has an embedding hole therein for accommodating the second strap, and the second strap is provided with a second positioning element to engage with and position in the embedding hole.

5. The retainer for eyeglasses of claim 3, wherein the embedding hole is further provided with at least one block at an open end of an inner edge thereof for connecting and limiting the second positioning element.

6. The retainer for eyeglasses of claim 4, wherein the embedding hole is further provided with at least one block therein at an open end of an inner edge of the embedded hole for connecting and limiting the second positioning element.

* * * * *